(12) United States Patent
Ehrmann Barr

(10) Patent No.: US 12,527,847 B1
(45) Date of Patent: Jan. 20, 2026

(54) COMPOSITIONS AND METHODS FOR REDUCING BLOOD ETHANOL CONCENTRATION THROUGH ALCOHOL DEHYDROGENASE AND ACETALDEHYDE SCAVENGERS

(71) Applicant: Goa Therapeutics Corporation, Lewes, DE (US)

(72) Inventor: Tami Ehrmann Barr, Metar (IL)

(73) Assignee: Goa Therapeutics Corporation, Lewes, DE (US)

( * ) Notice: Subject to any disclaimer, the term of this patent is extended or adjusted under 35 U.S.C. 154(b) by 0 days.

(21) Appl. No.: 19/255,556

(22) Filed: Jun. 30, 2025

Related U.S. Application Data

(62) Division of application No. 19/098,909, filed on Apr. 2, 2025.

(51) Int. Cl.
| | | |
|---|---|---|
| *A61K 31/00* | (2006.01) | |
| *A61K 31/198* | (2006.01) | |
| *A61K 31/385* | (2006.01) | |
| *A61K 31/51* | (2006.01) | |
| *A61K 38/06* | (2006.01) | |
| *A61K 38/44* | (2006.01) | |
| *A61K 47/02* | (2006.01) | |
| *A61P 39/02* | (2006.01) | |

(52) U.S. Cl.
CPC .......... *A61K 38/443* (2013.01); *A61K 31/198* (2013.01); *A61K 31/385* (2013.01); *A61K 31/51* (2013.01); *A61K 38/063* (2013.01); *A61K 47/02* (2013.01); *A61P 39/02* (2018.01); *C12Y 101/01001* (2013.01)

(58) Field of Classification Search
CPC .................................................. A61K 31/00
See application file for complete search history.

(56) References Cited

U.S. PATENT DOCUMENTS

| | | | |
|---|---|---|---|
| 3,493,467 | A | 2/1970 | Drell et al. |
| 3,926,736 | A | 12/1975 | Bucolo |
| 5,112,741 | A | 5/1992 | Palmer et al. |
| 5,141,854 | A | 8/1992 | Kaufman et al. |

(Continued)

FOREIGN PATENT DOCUMENTS

| | | |
|---|---|---|
| JP | 4777495 B2 | 9/2011 |
| WO | WO-2014011676 A1 | 1/2014 |
| WO | WO-2016191468 A1 | 12/2016 |

OTHER PUBLICATIONS

Vinci et al., Synapse, "Acetaldehyde elicits ERK phosphorylation in the rat nucleus accumbens and extended amygdala," Synapse 64(12):916-927, 2010.*

(Continued)

*Primary Examiner* — Rosanne Kosson
(74) *Attorney, Agent, or Firm* — MORRISON & FOERSTER LLP

(57) ABSTRACT

The present disclosure relates to compositions and methods for reducing blood ethanol concentration through a dual-action mechanism involving alcohol dehydrogenase (ADH) and acetaldehyde (AcH) scavengers. The present disclosure provides a formulation that accelerates ethanol (EtOH) metabolism via ADH and rapidly eliminates AcH using scavengers, thereby driving the reaction equilibrium forward to enhance EtOH clearance.

17 Claims, 1 Drawing Sheet
Specification includes a Sequence Listing.

(56) References Cited

U.S. PATENT DOCUMENTS

| | | |
|---|---|---|
| 10,590,246 B2 | 3/2020 | Zhu et al. |
| 2010/0233747 A1 | 9/2010 | Olt |
| 2023/0338332 A1 | 10/2023 | Powell |

OTHER PUBLICATIONS

Aldeyra Therapeutics, Inc. ADX-102 Reduces Toxic Levels of Gamma-Hydroxybutyrate and Gamma-Aminobutyrate in Brain Tissue from Knockout Mouse Model. PR Newswire (2017): 2 pages.

Ledesma, Juan Carlos, et al. Modulation of ethanol-induced conditioned place preference in mice by 3-amino-1,2,4-triazole and D-penicillamine depends on ethanol dose and No. of conditioning trials. Psychopharmacology vol. 230 (2013): 557-568.

Mrozinski, Brent A. Acetaldehyde Scavengers for Poly(ethylene terephthalate): Chemistry of Reactions, Capacity, and Modeling of Interactions. Submitted to the Graduate Faculty as partial fulfillment of the requirements for the Doctor of Philosophy Degree in Engineering. The University of Toledo (2010): 333 pages.

Ochoa, Carmen A., et al. Aldehyde Trapping by ADX-102 Is Protective against Cigarette Smoke and Alcohol Mediated Lung Cell Injury. Biomolecules 12(393):1-13 (2022).

\* cited by examiner

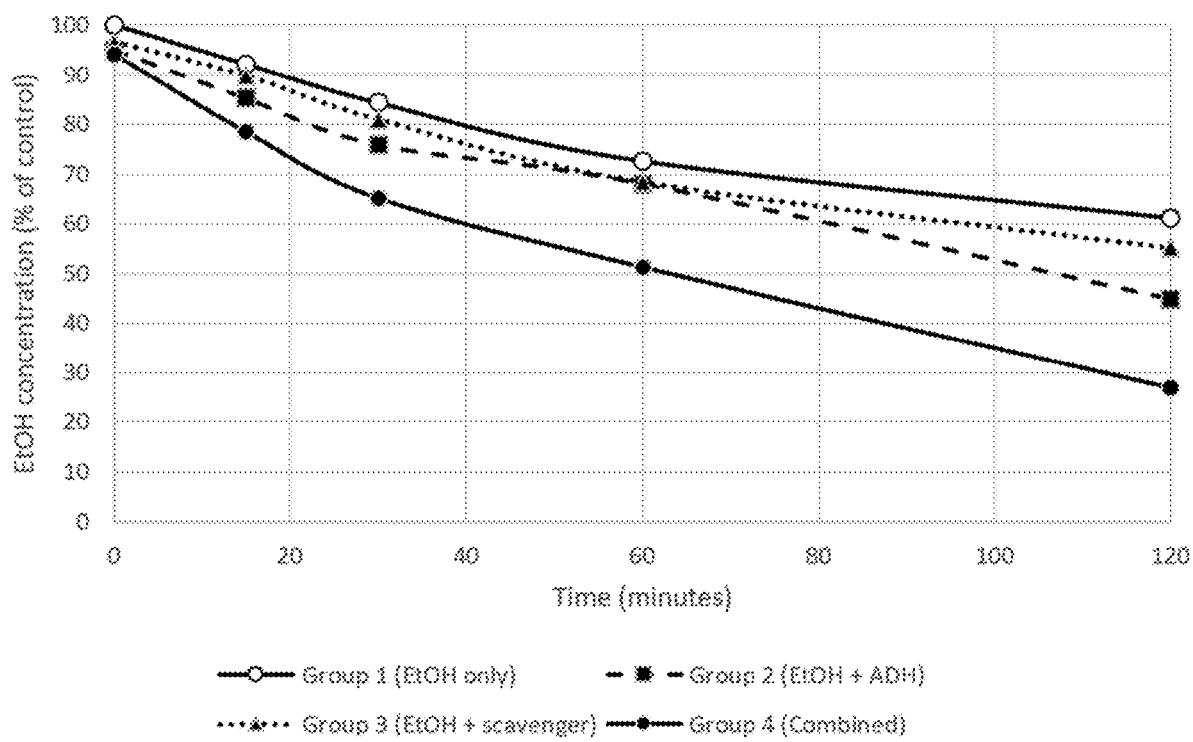

COMPOSITIONS AND METHODS FOR REDUCING BLOOD ETHANOL CONCENTRATION THROUGH ALCOHOL DEHYDROGENASE AND ACETALDEHYDE SCAVENGERS

CROSS-REFERENCE

This application is a divisional of U.S. application Ser. No. 19/098,909, filed Apr. 2, 2025, the entirety of which is hereby incorporated by reference herein.

INCORPORATION BY REFERENCE OF SEQUENCE LISTING

The instant application contains a Sequence Listing which has been submitted electronically in XML file format and is hereby incorporated by reference in its entirety. Said XML copy, created on Jun. 26, 2025, is named 69942-702.401_SL.xml and is 2,160 bytes in size.

BACKGROUND

Alcohol dehydrogenases (ADHes) are the primary enzymes for catalyzing the conversion of ethanol (EtOH) to acetaldehyde (AcH). Enhancing ADH activity can accelerate EtOH clearance, thereby reducing blood ethanol concentration more rapidly. However, the resulting increase in AcH concentration can exacerbate toxicity if not addressed concurrently.

AcH is a highly toxic metabolic byproduct of EtOH metabolism, primarily produced via the enzymatic action of alcohol dehydrogenase (ADH) in the liver. AcH is a major contributor to alcohol-induced tissue damage and adverse physiological effects.

The harmful effects of AcH include DNA damage, protein adduct formation, and increased oxidative stress, all of which contribute to mutagenesis and organ damage, particularly in the liver. AcH has been implicated in the pathogenesis of alcohol-induced liver diseases, facial flushing, and various cancers, particularly of the upper aero-digestive tract.

Genetic polymorphisms in aldehyde dehydrogenase (ALDH), particularly the ALDH2*2 variant common in East Asian populations, impair the metabolism of AcH, leading to its accumulation and associated symptoms such as "Asian flush."

Elevated AcH levels contribute to alcohol hangover symptoms, including headache, nausea, and fatigue, which persist even after EtOH has been cleared from the bloodstream.

AcH has also been linked to alcohol dependence, as it produces reinforcing effects in the central nervous system (CNS) that contribute to addiction.

No existing solution effectively addresses both EtOH and AcH clearance simultaneously, particularly during the critical early phase when blood ethanol concentration is still high and AcH accumulates rapidly.

Accordingly, there is an unmet need for compositions and methods that simultaneously reduce blood ethanol concentration and mitigate AcH toxicity, providing a comprehensive solution for managing the adverse effects of alcohol consumption.

SUMMARY

In one aspect disclosed herein is a pharmaceutical composition comprising (1) an alcohol dehydrogenase (ADH) and (2) an acetaldehyde (AcH) scavenger.

In some embodiments, the ADH is a microbial alcohol dehydrogenase. In some embodiments, the ADH is a *Saccharomyces cerevisiae* alcohol dehydrogenase. In some embodiments, the *Saccharomyces cerevisiae* alcohol dehydrogenase comprises SEQ ID NO: 1.

In some embodiments, the ADH is a plant alcohol dehydrogenase. In some embodiments, the ADH is an animal alcohol dehydrogenase. In some embodiments, the ADH is a mammalian alcohol dehydrogenase. In some embodiments, the ADH is a human alcohol dehydrogenase.

In some embodiments, the ADH is produced recombinantly.

In some embodiments, the AcH scavenger comprises a thiol-containing compound or an agent that sequesters AcH. In some embodiments, the AcH scavenger comprises the thiol-containing compound. In some embodiments, the AcH scavenger comprises the agent that sequesters AcH. In some embodiments, the AcH scavenger comprises the thiol-containing compound and the agent that sequesters AcH. In some embodiments, the composition further comprises an antioxidant.

In some embodiments, the pharmaceutical composition is formulated for one or more of oral or transmucosal administration. In some embodiments, the pharmaceutical composition further comprises a pharmaceutically acceptable excipient.

In another aspect disclosed herein is a method for reducing blood ethanol concentration and acetaldehyde (AcH) toxicity, the method comprising administering to a subject an effective amount of both (1) an alcohol dehydrogenase (ADH) and (2) an acetaldehyde (AcH) scavenger.

In some embodiments, the method comprises administering a composition as described above.

In some embodiments, the ADH and the AcH scavenger are administered before alcohol consumption. In some embodiments, the ADH and the AcH scavenger are administered concurrent with alcohol consumption. In some embodiments, the ADH and the AcH scavenger are administered after alcohol consumption.

In some embodiments, the administration of the ADH and the AcH scavenger reduces reactive oxygen species (ROS), increases cell viability, and protects the subject against alcohol-induced damages. In some embodiments, the administration of the ADH and the AcH scavenger decreases one or more symptoms associated with alcohol consumption. In some embodiments, the administration of ADH and the AcH scavenger results in reduced oxidative degradation. In some embodiments, the administration of the ADH and the AcH scavenger results in increased ADH stability, thereby preserving enzymatic activity of the ADH. In some embodiments, the administration of the ADH and the AcH scavenger both (1) accelerates EtOH metabolism due to action of the ADH and (2) removes AcH due to action of the AcH scavenger, thereby (1) shifting reaction equilibrium forward according to Le Chatelier's principle and (2) increasing the conversion rate of EtOH to AcH. In some embodiments, the presence of the AcH scavenger reduces the apparent Km and increases the apparent Vmax of the ADH, thereby increasing the rate of metabolism of EtOH.

In some embodiments, the AcH scavenger comprises a thiol-containing compound or an agent that sequesters AcH. In some embodiments, the AcH scavenger comprises the thiol-containing compound. In some embodiments, the AcH scavenger comprises the agent that sequesters AcH. In some embodiments, the AcH scavenger comprises the thiol-containing compound and the agent that sequesters AcH. In some embodiments, the method further comprises administering an antioxidant.

In another aspect disclosed herein is a kit comprising (1) an alcohol dehydrogenase (ADH) and (2) an acetaldehyde (AcH) scavenger.

In some embodiments, the alcohol dehydrogenase and the AcH scavenger are in a single composition. In some embodiments, the kit further comprises instructions for use.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

Various features of the present disclosure are set forth with particularity in the appended claims. A better understanding of the features and advantages of the present disclosure will be obtained by reference to the following detailed description that sets forth illustrative embodiments, in which the principles of the present disclosure are utilized, and the accompanying drawings (also "FIGURE" and "FIG." herein), of which:

FIG. 1 shows a plot displaying example measurements of ethanol concentration over time.

DETAILED DESCRIPTION

While various embodiments of the present disclosure have been shown and described herein, it will be obvious to those skilled in the art that such embodiments are provided by way of example only. Numerous variations, changes, and substitutions may occur to those skilled in the art without departing from the present disclosure. It should be understood that various alternatives to the embodiments of the present disclosure described herein may be employed.

As used herein, the term "scavenger" refers to a compound that interacts with AcH to decrease the concentration of free-AcH in solution. Scavengers include, but are not limited to, (1) thiol-containing compounds that form a hemiacetal or thioacetal adduct with AcH and (2) agents that sequester AcH to prevent it from interacting with ADH.

The present disclosure relates to compositions and methods for reducing blood ethanol concentration by combining alcohol dehydrogenase (ADH) with acetaldehyde (AcH) scavengers. The present disclosure provides novel approaches for managing elevated ethanol (EtOH) and AcH levels, particularly in the context of alcohol metabolism.

Combining ADH with AcH scavengers present a complementary approach: ADH accelerates EtOH breakdown, while the scavengers neutralize the resulting AcH, effectively mitigating both blood ethanol concentration and AcH toxicity.

This dual-action strategy can be particularly beneficial for individuals with ALDH deficiencies, chronic alcohol users, and patients experiencing acute alcohol intoxication.

Furthermore, this disclosure addresses a significant gap in current pharmacokinetic models, which often fail to account for AcH accumulation during EtOH metabolism.

The present disclosure provides a pharmaceutical composition combining ADH with one or more AcH scavengers. This combination achieves an effect by accelerating the conversion of ethanol (EtOH) to AcH (via ADH) and soon thereafter scavenging the AcH (via AcH scavengers), thereby reducing both blood ethanol concentration and AcH toxicity. The present disclosure is applicable for treating a range of alcohol-related conditions and for preventing alcohol-associated diseases. The composition may be administered through multiple delivery routes, ensuring effective bioavailability and therapeutic efficacy.

In the following detailed description, numerous specific details are set forth in order to provide a thorough understanding of the present disclosure. However, it will be understood by those skilled in the art that the present disclosure may be practiced without these specific details. In other instances, well-known methods, procedures, and components have not been described in detail so as not to obscure the present disclosure.

In some embodiments, the methods described herein may be used to treat humans or animals. In a preferred embodiment, the methods are used to treat humans.

Additional objects, advantages, and novel features of the present disclosure will become apparent to one ordinarily skilled in the art upon examination of the following examples, which are not intended to be limiting.

Various embodiments of the present disclosure are directed to formulations comprising one or more ADHs and one or more AcH scavenger(s).

The present disclosure includes embodiments addressing the metabolic pathway of EtOH by first converting EtOH to AcH using ADH, followed by the rapid elimination of AcH using one or more scavengers.

The present disclosure recognizes the interplay between ADH and AcH scavengers, emphasizing their combined effect. This dual-action mechanism harnesses the catalytic activity of ADH in converting EtOH to AcH and the subsequent rapid elimination of AcH through the action of AcH scavengers. This cooperation results in a significant increase of EtOH metabolism (e.g., an increase in the rate of metabolism), and a reduction of both blood ethanol concentration and AcH toxicity.

The mechanism of the dynamic equilibrium between ADH and AcH scavengers is grounded in Le Chatelier's principle, which states that a system at equilibrium will shift to counteract a change in concentration of a reactant or product. In the context of the present disclosure, the rapid removal of AcH by scavengers shifts the equilibrium of the enzymatic reaction catalyzed by ADH. As AcH is continually removed from the system, the reaction converting EtOH to AcH is driven forward, resulting in faster EtOH clearance from the body.

The reaction sequence may proceed as follows: a) EtOH oxidation—the enzyme ADH catalyzes the oxidation of EtOH to AcH according to the reaction; b) AcH scavenger(s) chemically react with AcH, in many cases forming non-toxic adducts or derivatives, thereby reducing free AcH concentration; and c) Equilibrium shift (Le Chatelier's Principle) as AcH is continuously removed from the system by scavenger(s), the equilibrium of the ADH-catalyzed reaction is shifted to the right, favoring further conversion of EtOH to AcH to restore equilibrium. The continuous elimination of AcH by scavenger(s) sustains a low AcH concentration, which accelerates the forward reaction of EtOH oxidation by ADH. This results in a self-reinforcing cycle where more EtOH is converted to AcH and subsequently removed from the system.

This dual mechanism demonstrates the biochemical interplay between ADH and AcH scavenger(s) and their influence on the EtOH metabolism pathway, driven by principles of enzymatic kinetics and equilibrium dynamics. This dual action lowers blood ethanol concentration faster than ADH or scavenger(s) alone and simultaneously prevents the accumulation of toxic AcH.

The present disclosure incorporates ADH, an enzyme responsible for converting EtOH to AcH. The ADH used may be of human origin (recombinant or purified), animal origin, plant origin, or microbial origin (e.g., yeast, bacterial, or fungal ADH).

In some embodiments, multiple variants of ADH are combined to enhance the enzymatic efficiency under various physiological conditions.

One of more scavengers may be used in combination with one or more ADHs. In some embodiments, the one or more scavengers include a thiol-containing compound that forms a hemiacetal or thioacetal adduct with AcH. For example, in some embodiments, the one or more AcH scavengers can comprise D-penicillamine, N-acetylcysteine (NAC), glutathione (GSH), L-cysteine, or cysteinylglycine (Cys-Gly), a salt thereof, or a combination thereof. In some embodiments, the one or more scavengers include an agent that sequesters AcH to prevent it from interacting with ADH. In some embodiments, AcH is sequestered via encapsulation, chelation, or adsorption. For instance, in some embodiments, the one of more scavengers that sequester, encapsulate, chelate to, or adsorb AcH comprise cyclodextrin (e.g., β-Cyclodextrin, α-Cyclodextrin, γ-Cyclodextrin), MXDA (meta-xylenediamine), anthranilamide, titanium dioxide ($TiO_2$), zeolites, activated carbon, zinc acetate, copper (II) salts, a salt thereof, or a combination thereof.

In some embodiments, the composition can comprise one or more antioxidants. In some embodiments, the one or more antioxidants can reduce oxidative stress caused by AcH. In some embodiments, the one or more antioxidants can scavenge free radicals. In some embodiments, the one or more antioxidants can comprise vitamin C, lipoic acid (e.g., α-lipoic acid), grapeseed extract, ginger root extract, curcumin, milk thistle extract, prickly pear leaf, *Picrorhiza kurroa* extract, tectoridin, a salt thereof, or a combination thereof.

Additionally, any salts, enantiomers, diastereomers, or derivatives of the listed scavengers are included within the scope of the present disclosure.

The present disclosure encompasses the use of one or more of these AcH scavengers, either alone or in combination. In an embodiment of the present disclosure, the selected AcH scavengers can lead to higher and/or faster AcH degradation.

The compositions may be administered via any suitable mode of administration. Modes of administration: the compositions may be formulated for various routes of administration, including but not limited to: (a) oral administration, (b) an intravenous administration or (c) transmucosal administration.

In some embodiments, the formulation includes liposomal encapsulation or other drug delivery technologies, such as micelles, nanoparticles, or hydrogels, to improve the bioavailability of ADH and AcH scavengers.

Pharmaceutical formulations: Pharmaceutical compositions may be formulated with pharmaceutically acceptable carriers, excipients, or diluents, including but not limited to: a) inert diluents such as calcium carbonate, mannitol, or lactose; b) binders such as starch or gelatin; c) disintegrants such as sodium starch glycolate; d) lubricants such as magnesium stearate or talc; e) solubilizers or stabilizers such as polyethylene glycol (PEG) or Tween 80; f) preservatives such as methylparaben and propylparaben; or g) sweeteners or flavoring agents.

The compositions of the present disclosure may include additional ingredients that are not physiologically active but serve to enhance the properties of the final composition. Further techniques for formulation and administration of active ingredients may be found in "Remington's Pharmaceutical Sciences," Mack Publishing Co., Easton, Pa., 23rd edition, 2018, which is incorporated herein by reference as if fully set forth herein.

Compositions of the present disclosure may, as desired, be presented in a pack, injector or dispenser device, such as an FDA (the U.S. Food and Drug Administration)-approved kit.

While preferred embodiments of the present disclosure have been shown and described herein, it will be obvious to those skilled in the art that such embodiments are provided by way of example only. It is not intended that the present disclosure be limited by the specific examples provided within the specification. While the present disclosure has been described with reference to the aforementioned specification, the descriptions and illustrations of the embodiments herein are not meant to be construed in a limiting sense. Numerous variations, changes, and substitutions will now occur to those skilled in the art without departing from the present disclosure. Furthermore, it shall be understood that all aspects of the present disclosure are not limited to the specific depictions, configurations or relative proportions set forth herein which depend upon a variety of conditions and variables. It should be understood that various alternatives to the embodiments of the present disclosure described herein may be employed in practicing the present disclosure. It is therefore contemplated that the present disclosure shall also cover any such alternatives, modifications, variations or equivalents. It is intended that the following claims define the scope of the present disclosure and that methods and structures within the scope of these claims and their equivalents be covered thereby.

EXAMPLES

Example 1: In Vitro Study on the Combined Effect of ADH and AcH Scavengers on EtOH and AcH Concentration Reduction An in vitro study was conducted to evaluate the effect of a combined formulation of ADH and AcH scavengers on the reduction of EtOH and AcH concentrations. The study was designed to assess the enzymatic conversion of EtOH to AcH by ADH and the subsequent removal of AcH by scavengers. The experiment was performed using enzyme preparation from yeast (*Saccharomyces cerevisiae*).

The following materials and reagents were used: EtOH 99.9% pure, analytical grade and ADH purified from *Saccharomyces cerevisiae* (500 U/mg protein) (SEQ ID NO: 1, see Table 1). AcH scavenger-containing composition (total 455 mg): Thiamine hydrochloride (Vitamin B1): 100 mg; Glutathione (GSH): 15 mg; NAC (N-Acetyl-Cysteine) OR L-Cysteine: 200 mg; α-Lipoic acid: 40 mg; Pyridoxine hydrochloride (Vitamin B6): 100 mg and buffer Solution: 100 mM sodium phosphate buffer, pH 7.4.

TABLE 1

| SEQ ID NO: | Identifier | Sequence |
|---|---|---|
| 1 | Saccharomyces cerevisiae ADH1 | MSTAVAVLTSNADTDIFAKPVAGVDGSHVIDAAAVFGLGKETV VDALKDYKTGATTPAVAQKLGVEGAKALVGVPQKVESNDFFV AKAKDAGTEVIVGGMGGVGLSAIGASLKPGYELDKAKIEVASK LAAGAKVTVITPQCGHEVIVGVPPDSQNLSMRIAQLGGKSPFTK EKDLNYFAVEKAKELGATGSKIINLIMGKVMPEGQKIHLGHEIV GDLGVVTKDAASGKLPIISIGHEAVKNAVKVLENAELEGLTKE GAKVTVVGNPQIYSDDHVAVAGTSLSTLNKLLDAIKKADTSKP IQEVLSDKAKEVGIEEGLMTTVHAITGAAGAASALPFGVTAAL |

The experiment was conducted in triplicate with appropriate controls to ensure reproducibility.

A total reaction volume of 1 mL was prepared for each sample, consisting of 100 µL of EtOH (final concentration: 100 mM); 200 U of ADH enzyme; AcH scavenger mixture (total 455 mg, with components as listed above); and 100 mM sodium phosphate buffer (pH 7.4).

Groups: Control 1: EtOH only (no ADH or scavengers), Control 2: EtOH+ADH (no scavengers), Control 3: EtOH+scavengers (no ADH).

All samples were incubated at 37° C. for 30 minutes with gentle shaking (150 rpm) to ensure uniform mixing and optimal enzyme activity. The reaction was stopped by adding 100 µL of 0.1 M hydrochloric acid (HCl) to each tube to denature the enzyme and halt the conversion of EtOH to AcH.

EtOH concentration was measured using a NAD/NADH-based enzymatic assay with a spectrophotometer at 340 nm. AcH concentration was measured using a modified Hantzsch reaction assay, which detects AcH at 412 nm.

The combined formulation of ADH and AcH scavengers demonstrated a significant reduction in both EtOH and AcH concentrations compared to the control groups.

The following results were obtained:

| Group | EtOH Reduction (%) | EtOH Final (mM) | AcH Final (µM) |
|---|---|---|---|
| Control 1 (EtOH only) | 0% | 100.0 | N/A |
| Control 2 (EtOH + ADH) | 14.2% | 85.8 | 235 |
| Control 3 (EtOH + Scavenger) | 0% | 100.0 | 0 |
| Combined (ADH + Scavenger) | 24.6% | 75.4 | 29.8 |

The highest reduction in both EtOH and AcH was achieved due to the effect of ADH converting EtOH to AcH and scavengers rapidly eliminating AcH. The results demonstrate the dual mechanism of the ADH and AcH scavenger combination. ADH facilitated the rapid conversion of EtOH to AcH, while the scavengers efficiently eliminated AcH, thereby driving the reaction forward (according to Le Chatelier's principle). This action led to a substantial reduction in both EtOH and AcH concentrations.

This in vitro study confirms that the combination of ADH and AcH scavengers effectively increases EtOH metabolism and eliminates its toxic intermediate, AcH. The results support the potential therapeutic use of this combination for reducing blood ethanol concentration and mitigating AcH-related toxicity in vivo. Further studies, including in vivo animal models, are recommended to confirm these findings and assess clinical applicability.

Example 2: In Vivo Study of Combined ADH and AcH Scavengers in Reducing Blood EtOH and AcH Concentrations in Rodents The study was performed to evaluate the efficacy of a combined formulation of ADH and AcH scavengers in reducing blood EtOH and AcH concentrations in an in vivo rodent model.

12 male Sprague-Dawley rats (200 to 250 g), housed under standard conditions (12-hour light/dark cycle, 22±2° C.) were administered with 2 g/kg EtOH orally via gavage.

Groups (n=3): Group 1 (Control): EtOH only (no ADH or scavengers). Group 2: EtOH+ADH (600 U/kg, intraperitoneally). Group 3: EtOH+AcH scavenger-containing composition. Group 4 (Combined): EtOH+ADH (600 U/kg, IP)+AcH scavenger-containing composition.

Blood samples were collected from the tail vein at 0, 15, 30, 60, and 120 minutes post-EtOH administration. EtOH concentration was measured using a NAD/NADH-based enzymatic assay.

Results:

| | EtOH concentration (% of control) | | | |
|---|---|---|---|---|
| Time (min) | Group 1 (EtOH) | Group 2 (EtOH + ADH) | Group 3 (EtOH + scavenger) | Group 4 (EtOH + ADH + scavenger) |
| 0 | 100 | 95 | 96.5 | 94 |
| 15 | 92.1 | 85.2 | 89.7 | 78.4 |
| 30 | 84.3 | 75.8 | 80.9 | 65.1 |
| 60 | 72.6 | 68 | 68.4 | 51.3 |
| 120 | 61.2 | 44.8 | 55.2 | 26.9 |

The combined group showed the greatest reduction in both EtOH concentrations due to ADH-facilitated conversion and subsequent scavenging of AcH. This effect was consistent across all time points (FIG. 1).

Example 3: Enzyme Kinetics Analysis of ADH with AcH Scavengers Using Michaelis-Menten Parameters ($V_{max}$ and $K_M$)

ADH purified from *Saccharomyces cerevisiae* (500 U/mg protein) was used. EtOH Concentrations: 5, 10, 20, 50, 100, 200 mM. Reaction Volume: 1 mL with 100 mM sodium phosphate buffer (pH 7.4). 37° C., 5 min incubation. NADH production measured at 340 nm using a spectrophotometer.

Two groups: a) control ADH+EtOH; and b) ADH+EtOH+AcH scavenger mixture.

| Parameter | Control (ADH only) | With Scavengers |
|---|---|---|
| $V_{max}$ (μmol/min) | 105.2 | 130.7 |
| $K_M$ (mM) | 32.5 | 27.1 |
| $k_{cat}$ | 105.2 | 130.7 |

The presence of AcH scavengers increased $V_{max}$ because removing AcH allows the enzyme to operate at full capacity. $K_M$ decreases (apparent) because the reaction is pulled forward, making it appear as though ADH has higher substrate affinity. $k_{cat}$ (Catalytic Rate Constant) increases, indicating that each enzyme molecule processes more substrate per unit time, confirming that the enzyme is working more efficiently.

Example 4: Stability and Degradation Profile of ADH in the Presence of AcH Scavengers Over Time Conditions: 37° C. for up to 60 min with gentle shaking (100 rpm), ADH activity assessed via NADH production (340 nm).

AcH scavenger-containing composition (total 455 mg): Thiamine hydrochloride (Vitamin B1): 100 mg; Glutathione (GSH): 15 mg; NAC (N-Acetyl-Cysteine) OR L-Cysteine: 200 mg; α-Lipoic acid: 40 mg; Pyridoxine hydrochloride (Vitamin B6): 100 mg and buffer Solution: 100 mM sodium phosphate buffer, pH 7.4.

| Time | ADH activity (% of t = 0) | |
|---|---|---|
| (min) | ADH | ADH + AcH scavengers |
| 30 | 87 | 92 |
| 60 | 62 | 87 |

The AcH scavenger-containing composition protected ADH from oxidative degradation, likely due to free radical scavenging (GSH, NAC, α-lipoic acid), thiol protection (NAC) and metal ion chelation (GSH).

| Class | Mechanism | Examples |
|---|---|---|
| Thiol-based | Nucleophilic attack on AcH, forming thiazolidine adducts | D-Penicillamine (D-Pen), L-Cysteine, N-Acetylcysteine (NAC), Glutathione (GSH), Cysteinylglycine (Cys-Gly) |
| Cyclodextrins | Encapsulation | β-Cyclodextrin, α-Cyclodextrin, γ-Cyclodextrin |
| Adsorbents | Surface binding | Titanium dioxide (TiO$_2$), Zeolites, Activated Carbon |
| Chelators | Metal complexation | Zinc acetate, Copper (II) salts |

Example 5: In Vitro Cellular Study on HepG2 Liver Cells Treated with ADH and AcH Scavengers to Evaluate the Protective Effect of ADH and AcH Scavengers Against EtOH and AcH-Induced Cytotoxicity Cells were exposed to 100 mM EtOH for 24 hours. Group 1 (Control): EtOH only; Group 2: EtOH+ADH; Group 3: EtOH+AcH scavenger-containing composition; and Group 4 (Combined): EtOH+ADH+AcH scavenger-containing composition.

Cell viability was detected by MTT assay (absorbance at 570 nm). ROS (Reactive Oxygen Species) was detected by DCFH-DA assay (fluorescence at 488 nm).

Results:

| Treatment | Cell viability (%) | ROS (% of control) |
|---|---|---|
| EtOH (control) | 52.3 | 100 |
| EtOH + ADH (Group 2) | 67.1 | 85.6 |
| EtOH + AcH scavengers (Group 3) | 71.4 | 63.2 |
| EtOH + ADH + Scavengers (Group 4) | 92.8 | 35.5 |

Results Interpretation:

| Group | EtOH Effect | AcH Effect | ROS Impact | Overall Impact on Viability | Viability (%) |
|---|---|---|---|---|---|
| Group 1 (EtOH only, no ADH, no scavengers) | High EtOH toxicity results in membrane damage, oxidative stress, mitochondrial dysfunction | Low AcH (since ADH is not added) | High ROS from EtOH metabolism | Lowest viability due to prolonged EtOH toxicity | 52.30% |
| Group 2 (EtOH + ADH) | Lower EtOH due to ADH convertion fo EtOH to AcH, reducing direct EtOH toxicity | the higher AcH is toxic, but metabolized by endogenous ALDH | Moderate ROS from AcH accumulation | Viability increases since EtOH toxicity is reduced, though AcH still causes stress | 67.10% |
| Group 3 (EtOH + AcH Scavengers, No ADH) | High EtOH toxicity (same as Group 1) since ADH is not added | Low AcH (scavengers prevent accumulation) | Lower ROS due to antioxidant effects of scavengers | Viability improves due to antioxidant protection but EtOH toxicity remains | 71.40% |
| Group 4 (EtOH + ADH + AcH Scavengers) | Lowest EtOH toxicity due to ADH conversion of EtOH to AcH rapidly | Lowest AcH toxicity since the scavengers remove AcH efficiently | Lowest ROS from both EtOH reduction and antioxidant protection | Highest viability due to clearance of EtOH and AcH | 92.80% |

What is claimed is:

1. A pharmaceutical composition comprising (1) an alcohol dehydrogenase (ADH) and (2) an acetaldehyde (AcH) scavenger.

2. The pharmaceutical composition of claim 1, wherein the ADH is a microbial alcohol dehydrogenase.

3. The pharmaceutical composition of claim 1, wherein the ADH is a plant alcohol dehydrogenase.

4. The pharmaceutical composition of claim 1, wherein the ADH is an animal alcohol dehydrogenase.

5. The pharmaceutical composition of claim 4, wherein the ADH is a mammalian alcohol dehydrogenase.

6. The pharmaceutical composition of claim 5, wherein the ADH is a human alcohol dehydrogenase.

7. The pharmaceutical composition of claim 1, wherein the ADH is produced recombinantly.

8. The pharmaceutical composition of claim 1, wherein the AcH scavenger comprises a thiol-containing compound or an agent that sequesters AcH.

9. The pharmaceutical composition of claim 8, wherein the AcH scavenger comprises the thiol-containing compound and the agent that sequesters AcH.

10. The pharmaceutical composition of claim 1, wherein the composition further comprises an antioxidant.

11. The pharmaceutical composition of claim 1, wherein the pharmaceutical composition is formulated for one or more of oral, intravenous, or transmucosal administration.

12. The pharmaceutical composition of claim 1, further comprising a pharmaceutically acceptable excipient.

13. The pharmaceutical composition of claim 1, wherein the AcH scavenger comprises a thiol-containing compound.

14. The pharmaceutical composition of claim 13, wherein the thiol-containing compound comprises penicillamine.

15. The pharmaceutical composition of claim 1, wherein the AcH scavenger comprises an agent that sequesters AcH.

16. A kit comprising (1) an alcohol dehydrogenase (ADH) and (2) an acetaldehyde (AcH) scavenger.

17. The pharmaceutical composition of claim 11, wherein the pharmaceutical composition is formulated for intravenous administration.

* * * * *

SEQUENCE LISTING

```
Sequence total quantity: 1
SEQ ID NO: 1             moltype = AA  length = 345
FEATURE                  Location/Qualifiers
source                   1..345
                         mol_type = protein
                         organism = Saccharomyces cerevisiae
SEQUENCE: 1
MSTAVAVLTS NADTDIFAKP VAGVDGSHVI DAAAVFGLGK ETVVDALKDY KTGATTPAVA   60
QKLGVEGAKA LVGVPQKVES NDFFVAKAKD AGTEVIVGGM GGVGLSAIGA SLKPGYELDK  120
AKIEVASKLA AGAKVTVITP QCGHEVIVGV PPDSQNLSMR IAQLGGKSPF TKEKDLNYFA  180
VEKAKELGAT GSKIINLIMG KVMPEGQKIH LGHEIVGDLG VVTKDAASGK LPIISIGHEA  240
VKNAVKVLEN AELEGLTKEG AKVTVVGNPQ IYSDDHVAVA GTSLSTLNKL LDAIKKADTS  300
KPIQEVLSDK AKEVGIEEGL MTTVHAITGA AGAASALPFG VTAAL                 345
```